United States Patent
Lu et al.

(10) Patent No.: US 11,209,555 B2
(45) Date of Patent: Dec. 28, 2021

(54) POSITIONING METHOD AND APPARATUS FOR MOBILE TERMINAL, AND MOBILE TERMINAL

(71) Applicant: HUAWEI TECHNOLOGIES CO., LTD., Guangdong (CN)

(72) Inventors: Chenxi Lu, Beijing (CN); Yuanfeng Chen, Shenzhen (CN); Li Kang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 483 days.

(21) Appl. No.: 15/764,263

(22) PCT Filed: Nov. 10, 2015

(86) PCT No.: PCT/CN2015/094224
§ 371 (c)(1),
(2) Date: Mar. 28, 2018

(87) PCT Pub. No.: WO2017/054298
PCT Pub. Date: Apr. 6, 2017

(65) Prior Publication Data
US 2018/0239027 A1    Aug. 23, 2018

(30) Foreign Application Priority Data
Sep. 29, 2015 (WO) ............... PCT/CN2015/091138

(51) Int. Cl.
*G01S 19/47* (2010.01)
*G01S 19/49* (2010.01)
(Continued)

(52) U.S. Cl.
CPC .............. *G01S 19/47* (2013.01); *G01S 19/34* (2013.01); *G01S 19/49* (2013.01); *G01S 19/45* (2013.01); *H04W 4/023* (2013.01); *H04W 4/024* (2018.02)

(58) Field of Classification Search
CPC .......... G01S 19/34; G01S 19/45; G01S 19/47; G01S 19/48; G01S 19/49; G01C 21/10;
(Continued)

(56) References Cited

U.S. PATENT DOCUMENTS 7,171,303 B1 * 1/2007 Nordmark ............ G01C 21/165
701/472
7,460,064 B1 * 12/2008 Tester ..................... G01S 19/13
342/357.51
(Continued)

FOREIGN PATENT DOCUMENTS

CN 101035386 A 9/2007
CN 101769747 A 7/2010
(Continued)

OTHER PUBLICATIONS

International Search Report issued in International Application No. PCT/CN2015/091138 dated Jun. 22, 2016, 13 pages.
(Continued)

*Primary Examiner* — Chuong P Nguyen
(74) *Attorney, Agent, or Firm* — Fish & Richardson P.C.

(57) ABSTRACT

A positioning method and apparatus for a mobile terminal, and a mobile terminal. After a first time period elapses, a main processor obtains M pieces of reliable navigation data from N pieces of buffered navigation data of the mobile terminal, and obtains K pieces of buffered position change data of the mobile terminal. The main processor combines the M pieces of reliable navigation data and the K pieces of position change data, to obtain position information of the
(Continued)

mobile terminal in the first time period. The N pieces of navigation data are obtained through calculation by using a satellite navigation signal of the mobile terminal that is received during the first time period. The K pieces of position change data are obtained through calculation by using data that is obtained through monitoring by a sensor of the mobile terminal during the first time period.

20 Claims, 8 Drawing Sheets

(51) Int. Cl.
　　　G01S 19/34　　(2010.01)
　　　H04W 4/024　　(2018.01)
　　　G01S 19/45　　(2010.01)
　　　H04W 4/02　　(2018.01)
(58) Field of Classification Search
　　　CPC ...... G01C 21/08; G01C 21/16; G01C 21/165; G01C 21/28; H04W 4/024; H04W 4/023
　　　USPC ............ 342/357.3, 357.28, 357.74, 357.31, 342/357.32; 701/472, 495, 500
　　　See application file for complete search history.

(56) References Cited

U.S. PATENT DOCUMENTS

| | | | | |
|---|---|---|---|---|
| 8,054,220 B1* | 11/2011 | Tester | ............... | G01S 19/34 342/357.51 |
| 8,362,949 B2* | 1/2013 | Yang | ............... | G01S 19/49 342/357.31 |
| 8,391,888 B2* | 3/2013 | Hanada | ............... | G01S 19/34 455/456.1 |
| 8,560,218 B1* | 10/2013 | Kahn | ............... | G01S 19/49 701/472 |
| 8,655,578 B2* | 2/2014 | Sambongi | ............... | G01S 19/03 701/410 |
| 8,692,709 B2* | 4/2014 | Sambongi | ............... | G01C 21/165 342/357.32 |
| 9,291,704 B2* | 3/2016 | Sridhara | ............... | H04W 4/027 |
| 9,451,580 B2* | 9/2016 | Luo | ............... | H04W 64/006 |
| 9,880,286 B2* | 1/2018 | Rudow | ............... | G01S 19/48 |
| 10,514,468 B2* | 12/2019 | Xia | ............... | B62J 45/00 |
| 2005/0049787 A1* | 3/2005 | Cho, II | ............... | G01S 19/49 701/472 |
| 2007/0010936 A1 | 1/2007 | Nordmark et al. | | |
| 2008/0266174 A1* | 10/2008 | Medina Herrero | ... | G01S 5/0027 342/357.59 |
| 2009/0278738 A1* | 11/2009 | Gopinath | ............... | G01S 19/47 342/357.74 |
| 2011/0106450 A1 | 5/2011 | Toda et al. | | |
| 2011/0175772 A1* | 7/2011 | Sambongi | ............... | G01S 19/49 342/357.3 |
| 2011/0237275 A1 | 9/2011 | Hanada et al. | | |
| 2011/0291886 A1 | 12/2011 | Krieter | | |
| 2012/0062414 A1 | 3/2012 | Sambongi | | |
| 2012/0176270 A1 | 7/2012 | Shin | | |
| 2015/0304985 A1 | 10/2015 | Luo et al. | | |

FOREIGN PATENT DOCUMENTS

| | | |
|---|---|---|
| CN | 102243315 A | 11/2011 |
| CN | 102645667 A | 8/2012 |
| CN | 102901975 A | 1/2013 |
| CN | 103312902 A | 9/2013 |
| CN | 103454659 A | 12/2013 |
| CN | 104598253 A | 5/2015 |
| CN | 104749592 A | 7/2015 |
| CN | 104793223 A | 7/2015 |
| CN | 105223595 A | 1/2016 |
| JP | 2011209057 A | 10/2011 |
| JP | 2012083323 A | 4/2012 |
| JP | 2014190827 A | 10/2014 |

OTHER PUBLICATIONS

International Search Report issued in International Application No. PCT/CN2015/094224 dated Jun. 16, 2016, 14 pages.
Office Action issued in Japanese Application No. 2018-516168 dated Jul. 2, 2019, 10 pages (with English translation).
Office Action issued in Chinese Application No. 201580027805.8 dated Jul. 12, 2019, 16 pages (with English translation).

* cited by examiner

| GNSS module is running | GNSS module is sleeping | GNSS module is running | GNSS module is sleeping | GNSS module is running | GNSS module is sleeping |
|---|---|---|---|---|---|
| DR module is running || DR module is running || DR module is running ||

Main processor unit is woken up      Main processor unit is woken up      Main processor unit is woken up

FIG. 4

POSITIONING METHOD AND APPARATUS FOR MOBILE TERMINAL, AND MOBILE TERMINAL

CROSS REFERENCE TO RELATED APPLICATIONS

This application is a national stage of International Application No. PCT/CN2015/094224, filed on Nov. 10, 2015, which claims priority to International Application No. PCT/CN2015/091138, filed on Sep. 29, 2015. Both of the aforementioned applications are hereby incorporated by reference in their entireties.

TECHNICAL FIELD

Embodiments of the present invention relate to communications technologies, and in particular, to a positioning method and apparatus for a mobile terminal, and a mobile terminal.

BACKGROUND

A global navigation satellite system (Global Navigation Satellite System, GNSS) is a generic term for a type of system that uses a navigation satellite to implement positioning. The GNSS can obtain user coordinates over the globe, and is a widely used positioning technology. However, in urban areas, due to reflection and blockage of a navigation signal, drifting usually exists in a positioning result or even positioning cannot be implemented. Dead reckoning (Dead Reckoning, DR) is a technology that uses a sensor module (such as an accelerometer, a gyroscope, and a magnetic field sensor) of a mobile terminal to calculate a relative position of a moving user. The dead reckoning does not rely on an external wireless signal, and can implement positioning when a navigation signal is blocked. However, accuracy of the DR deteriorates because errors are accumulated over time.

In the prior art, two sets of positioning systems: the GNSS and the DR may be operated simultaneously to separately output positioning results, and a central processing unit (CPU) performs real-time fusion processing on the positioning results of the two sets of positioning systems to implement accurate positioning. However, real-time fusion processing performed by the CPU causes relatively high power consumption of a terminal.

SUMMARY

Embodiments of the present invention provide a positioning method and apparatus for a mobile terminal, and a mobile terminal, to resolve a prior-art problem of high power consumption of positioning services.

According to a first aspect, an embodiment of the present invention provides a positioning method for a mobile terminal, where the mobile terminal includes a main processor, and the method includes:

obtaining, by the main processor after a first time period elapses, M pieces of reliable navigation data from N pieces of buffered navigation data of the mobile terminal, where N≥M, M≥1, M and N are integers, and the N pieces of navigation data are obtained through calculation by using a satellite navigation signal of the mobile terminal that is received during the first time period;

obtaining, by the main processor after the first time period elapses, K pieces of buffered position change data of the mobile terminal, where K≥1, K is an integer, and the K pieces of position change data are obtained through calculation by using data that is obtained through monitoring by a sensor of the mobile terminal during the first time period; and combining, by the main processor, the M pieces of reliable navigation data and the K pieces of position change data, to obtain position information of the mobile terminal in the first time period.

Optionally, the obtaining, by the main processor, M pieces of reliable navigation data from N pieces of buffered navigation data of the mobile terminal includes:

where each of the N pieces of navigation data is corresponding to one moment and one signal strength, and the N pieces of navigation data are corresponding to moments $t_1, t_2, \ldots,$ and $t_N$ respectively according to an order of the moments;

traversing, by the main processor according to the order of the moments, signal strengths of the N pieces of navigation data;

determining, by the main processor, a status of first navigation data to be high, where the first navigation data is the first piece of navigation data, of the N pieces of navigation data, with a signal strength greater than or equal to a first threshold;

determining, by the main processor, a status of another piece of navigation data in the following manner, where the another piece of navigation data is navigation data, following the first navigation data, of the N pieces of navigation data: if a status of navigation data at a moment $t_i$ is high, when a signal strength of navigation data at a moment $t_{i+1}$ is less than a second threshold, determining a status of the navigation data at the moment $t_{i+1}$ to be low; or if a status of navigation data at a moment $t_i$ is low, when a signal strength of navigation data at a moment $t_{i+1}$ is greater than or equal to a third threshold, determining a status of the navigation data at the moment $t_{i+1}$ to be high, where $1 \le i \le n$, i is an integer, and the second threshold is greater than the third threshold; and determining, by the main processor, all navigation data whose status is high as the M pieces of reliable navigation data.

Optionally, the obtaining, by the main processor, M pieces of reliable navigation data from N pieces of buffered navigation data of the mobile terminal includes:

where each of the N pieces of navigation data is corresponding to one moment and one signal strength, and the N pieces of navigation data are corresponding to moments $t_1, t_2, \ldots,$ and $t_N$ respectively according to an order of the moments;

traversing, by the main processor according to the order of the moments, signal strengths of the N pieces of navigation data;

obtaining, by the main processor, a status of previous navigation data preceding the first piece of navigation data of the N pieces of navigation data, where a moment $t_0$ corresponding to the previous navigation data is prior to the moment $t_1$ corresponding to the first piece of navigation data, and the moment $t_0$ is adjacent to the moment $t_1$;

determining, by the main processor, statuses of the N pieces of navigation data in the following manner: if a status of navigation data at a moment $t_{i-1}$ is high, when a signal strength of navigation data at a moment $t_i$ is less than a second threshold, determining a status of the navigation data at the moment $t_i$ to be low; or if a status of navigation data at a moment $t_{i-1}$ is low, when a signal strength of navigation data at a moment $t_i$ is greater than or equal to a third threshold, determining a status of the navigation data at the moment $t_i$ to be high, where 1≤i≤n, i is an integer, and the second threshold is greater than the third threshold; and determining, by the processor, all navigation data whose status is high as the M pieces of reliable navigation data.

Optionally, each of the navigation data is corresponding to one moment, and each of the position change data is corresponding to one moment; and when a moment of the $m^{th}$ piece of navigation data is the same as a moment of the $n^{th}$ piece of position change data, the $m^{th}$ piece of navigation data is set to match the $n^{th}$ piece of position change data; and the combining, by the main processor, the M pieces of reliable navigation data and the K pieces of position change data, to obtain position information of the mobile terminal in the first time period includes:

obtaining, by the main processor, reliable navigation data and position change data that match each other from the M pieces of reliable navigation data and the K pieces of position change data; and combining, by the main processor, the reliable navigation data and the position change data that match each other, and in combination with position change data that is not combined, obtaining the position information of the mobile terminal in the first time period.

Optionally, the navigation data is data that is obtained through calculation by using the satellite navigation signal of the mobile terminal and from which position coordinates are to be calculated, and the combining, by the main processor, the M pieces of reliable navigation data and the K pieces of position change data, to obtain position information of the mobile terminal in the first time period includes:

obtaining, by the main processor through calculation, M position coordinates according to the M pieces of reliable navigation data; and combining, by the main processor, the M position coordinates and the K pieces of position change data, to obtain the position information of the mobile terminal in the first time period.

Optionally, the navigation data is position coordinates.

Optionally, the method further includes:

remaining, by the main processor, in a sleep state during the first time period; and being woken up, by the main processor, after the first time period elapses.

Optionally, the method further includes:

entering, by the main processor, a sleep state after obtaining the position information of the mobile terminal in the first time period.

Optionally, the position information of the mobile terminal in the first time period includes at least two position coordinates, and each of the position coordinates is corresponding to one moment of the first time period.

According to a second aspect, an embodiment of the present invention further provides a positioning method for a mobile terminal, where the mobile terminal includes a main processor, and the method includes:

receiving a satellite navigation signal of the mobile terminal during a first time period;

obtaining through calculation N pieces of navigation data according to the satellite navigation signal, and buffering the N pieces of navigation data, where N≥1, and N is an integer;

monitoring, during the first time period, movement data of the mobile terminal by using a sensor of the mobile terminal;

obtaining through calculation K pieces of position change data of the mobile terminal according to the movement data that is obtained by the sensor through monitoring, and buffering the K pieces of position change data, where K≥1, and K is an integer;

obtaining, by the main processor after the first time period elapses, M pieces of reliable navigation data from the N pieces of navigation data, where N≥M, M≥1, and M is an integer; and combining, by the main processor, the M pieces of reliable navigation data and the K pieces of position change data, to obtain position information of the mobile terminal in the first time period.

Optionally, the method according to the second aspect may further include all the optional solutions in the first aspect.

According to a third aspect, an embodiment of the present invention provides a positioning apparatus for a mobile terminal, including:

an obtaining module, configured to obtain M pieces of reliable navigation data from N pieces of buffered navigation data of the mobile terminal after a first time period elapses, where N≥M, M≥1, M and N are integers, and the N pieces of navigation data are obtained through calculation by using a satellite navigation signal of the mobile terminal that is received during the first time period; where the obtaining module is further configured to obtain K pieces of buffered position change data of the mobile terminal after the first time period elapses, where K≥1, K is an integer, and the K pieces of position change data are obtained through calculation by using data that is obtained through monitoring by a sensor of the mobile terminal during the first time period; and a data processing module, configured to combine the M pieces of reliable navigation data and the K pieces of position change data, to obtain position information of the mobile terminal in the first time period.

Optionally, each of the N pieces of navigation data is corresponding to one moment and one signal strength, and the N pieces of navigation data are corresponding to moments $t_1, t_2, \ldots,$ and $t_N$ respectively according to an order of the moments; and the obtaining module is specifically configured to:

traverse signal strengths of the N pieces of navigation data according to the order of the moments;

determine a status of first navigation data to be high, where the first navigation data is the first piece of navigation data, of the N pieces of navigation data, with a signal strength greater than or equal to a first threshold;

determine a status of another piece of navigation data in the following manner, where the another piece of navigation data is navigation data, following the first navigation data, of the N pieces of navigation data: if a status of navigation data at a moment $t_i$ is high, when a signal strength of navigation data at a moment $t_{i+1}$ is less than a second threshold, determine a status of the navigation data at the moment $t_{i+1}$ to be low; or if a status of navigation data at a moment $t_i$ is low, when a signal strength of navigation data at a moment $t_{i+1}$ is greater than or equal to a third threshold, determine a status of the navigation data at the moment $t_{i+1}$ to be high, where 1≤i≤n, i is an integer, and the second threshold is greater than the third threshold; and determine all navigation data whose status is high as the M pieces of reliable navigation data.

Optionally, each of the N pieces of navigation data is corresponding to one moment and one signal strength, and the N pieces of navigation data are corresponding to moments $t_1, t_2, \ldots,$ and $t_N$ respectively according to an order of the moments; and the obtaining module is specifically configured to:

traverse signal strengths of the N pieces of navigation data according to the order of the moments; and obtain a status of previous navigation data preceding the first piece of navigation data of the N pieces of navigation data, where a moment $t_0$ corresponding to the previous navigation data is prior to the moment $t_1$ corresponding to the first piece of navigation data, and the moment $t_0$ is adjacent to the moment $t_1$;

determine statuses of the N pieces of navigation data in the following manner: if a status of navigation data at a moment $t_{i-1}$ is high, when a signal strength of navigation data at a moment $t_i$ is less than a second threshold, determine a status of the navigation data at the moment $t_i$ to be low; or if a status of navigation data at a moment $t_{i-1}$ is low, when a signal strength of navigation data at a moment $t_i$ is greater than or equal to a third threshold, determine a status of the navigation data at the moment $t_i$ to be high, where $1 \leq i \leq n$, and the second threshold is greater than the third threshold; and determine all navigation data whose status is high as the M pieces of reliable navigation data.

Optionally, each of the navigation data is corresponding to one moment, and each of the position change data is corresponding to one moment; and when a moment of the $m^{th}$ piece of navigation data is the same as a moment of the $n^{th}$ piece of position change data, the $m^{th}$ piece of navigation data is set to match the $n^{th}$ piece of position change data; and the data processing module is specifically configured to:

obtain reliable navigation data and position change data that match each other from the M pieces of reliable navigation data and the K pieces of position change data; and combine the reliable navigation data and the position change data that match each other, and in combination with position change data that is not combined, obtain the position information of the mobile terminal in the first time period.

Optionally, the navigation data is data that is obtained through calculation by using the satellite navigation signal of the mobile terminal and from which position coordinates are to be calculated; and the data processing module is specifically configured to:

obtain through calculation M position coordinates according to the M pieces of reliable navigation data; and combine the M position coordinates and the K pieces of position change data, to obtain the position information of the mobile terminal in the first time period.

Optionally, the apparatus further includes:

a wake-up module, configured to wake up the positioning apparatus after the first time period elapses; where the positioning apparatus is in a sleep state during the first time period.

Optionally, the apparatus further includes:

a sleep module, configured to enable the positioning apparatus to enter a sleep state after the position information of the mobile terminal in the first time period is obtained.

According to a fourth aspect, an embodiment of the present invention provides a mobile terminal, including a main processor, a global navigation satellite system GNSS receiver, a sensor, and a coprocessor, where the main processor is configured to execute any one of the foregoing methods;

the GNSS receiver is configured to: receive a satellite navigation signal of the mobile terminal during a first time period, and calculate navigation data from the satellite navigation signal, where the navigation data is data from which position coordinates are to be calculated or the navigation data is position coordinates;

the sensor is configured to monitor movement data of the mobile terminal during the first time period; and the coprocessor is configured to obtain through calculation K pieces of position change data according to the movement data that is obtained by the sensor through monitoring; or the coprocessor is configured to: obtain through calculation K pieces of position change data according to the movement data that is obtained by the sensor through monitoring, and calculate the position coordinates from the navigation data.

Optionally, the first time period includes a second time period, and the global navigation satellite system GNSS receiver is in a sleep state during the second time period; and the sensor is in a working state during the first time period.

In the embodiments of the present invention, N pieces of navigation data and K pieces of position change data that are obtained during a first time period are separately buffered. A main processor may obtain the K pieces of position change data after the first time period elapses, obtain M pieces of reliable navigation data from the N pieces of buffered navigation data, and combine the reliable navigation data and the position change data, to obtain position information of a mobile terminal. During a process of obtaining the N pieces of navigation data and the K pieces of position change data, the main processor does not need to be turned on in real time, thereby reducing positioning power consumption of a system.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

FIG. 4 is a schematic diagram of an operating manner of a GNSS receiver and a DR module according to an embodiment of the present invention;

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the embodiments of the present invention, a GNSS positioning technology and a DR positioning technology are combined to improve positioning performance, and a main processor combines a GNSS positioning result and a DR positioning result in a non-real-time manner to reduce positioning power consumption.

Specifically, GNSS is a generic term for a type of system that uses a navigation satellite to implement positioning, and may include America's Global Positioning System (Global Positioning System, GPS), Russia's GLONASS (GLONASS), Europe's Galileo (Galileo), China's BeiDou System, Japan's Quasi-Zenith Satellite System (Quasi-Zenith Satellite System, QZSS), and so on. The GNSS can be used to obtain user coordinates over the globe, and is a widely used positioning technology. However, in urban areas, a navigation signal is likely to be reflected or blocked by buildings, drifting exists in a positioning result or even positioning cannot be implemented by using the GNSS positioning technology.

The DR positioning technology uses a sensor module (such as an accelerometer, a gyroscope, and a magnetic field sensor) of a mobile terminal to calculate a relative position of a moving user. The DR positioning technology does not rely on an external wireless signal, and can implement positioning when a navigation signal is blocked. However, accuracy of DR positioning deteriorates as errors are accumulated over time.

Figure 1:
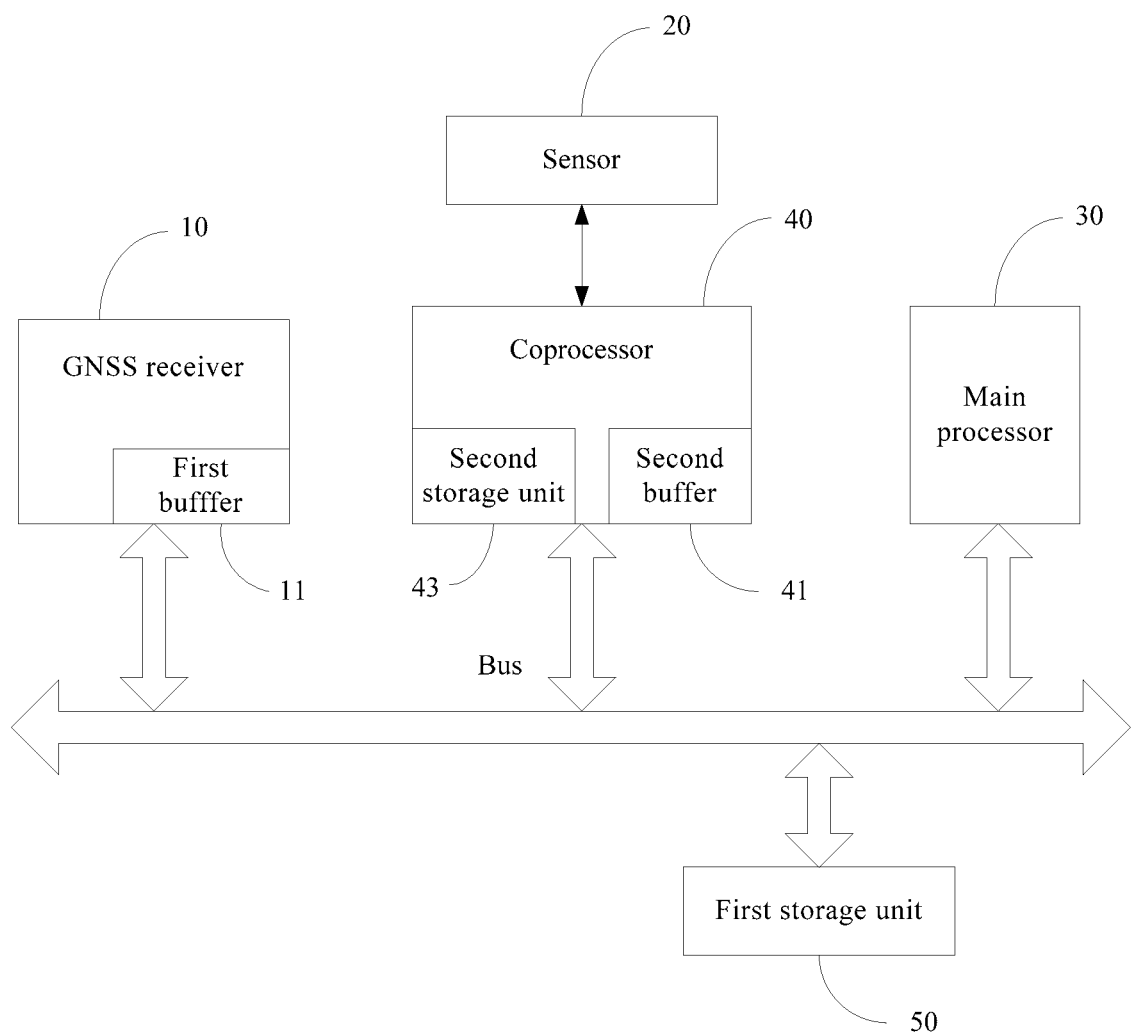
FIG. 1 is a schematic diagram of a frame structure of a mobile terminal according to an embodiment of the present invention.

FIG. 1 is a schematic diagram of a frame structure of a mobile terminal according to an embodiment of the present invention. Referring to FIG. 1, the mobile terminal includes components such as a GNSS receiver 10, a sensor 20, a main processor 30, a coprocessor 40, a first storage unit 50, and a second storage unit 43. The components communicate with each other by using one or more buses. It can be understood by a person skilled in the art that the structure of the mobile terminal shown in the figure does not constitute any limitation on the present invention. The structure may be either a bus structure or a star structure, and may include more or less components than those shown in the figure, or may combine some parts, or may have a component layout different from that in the figure. The mobile terminal may be any mobile or portable electronic device, and includes but is not limited to a mobile phone, a mobile computer, a tablet computer, a personal digital assistant (Personal Digital Assistant, PDA), a navigation apparatus, a mobile internet device (Mobile Internet Device, MID), or a wearable device (Wearable Device).

The GNSS receiver 10 is configured to: receive a navigation signal transmitted by a GNSS navigation satellite, and calculate data such as a pseudorange, a navigation message, and a signal strength from the navigation signal. The GNSS receiver 10 may be a GNSS receiver, a GNSS positioning chip, and the like. A satellite of one of the GPS, the GLONASS, the Galileo, the BeiDou System, the QZSS, or another system may be used for navigation (a single-mode receiver), or more than one system may be simultaneously used to implement positioning (a multi-mode receiver). The main processor 30 obtains through calculation position coordinates of a user according to the data such as the pseudorange, the navigation message, and the signal strength. The GNSS receiver may include an integrated circuit, such as a GNSS chip. The GNSS receiver includes a first buffer 11, configured to buffer data such as a measurement and a navigation message. The first buffer 11 is a storage area integrated in the GNSS receiver and may include an integrated circuit.

The sensor 20 may include an accelerometer, a gyroscope, a magnetic field sensor, and the like. The sensor 20 is connected to the coprocessor 40 by using a transmission circuit, such as an I2C bus, and transmits physical data obtained through measurement by the sensor 20 to the coprocessor 40 for processing.

The main processor 30 and the coprocessor 40 are control centers of the mobile terminal; are connected to various parts of the entire electronic device by using various interfaces and lines; and run or execute a software program and/or a module stored in the storage unit and invoke data stored in the storage unit, to implement various functions of the electronic device and/or process data. The main processor 30 and the coprocessor 40 may include an integrated circuit (Integrated Circuit, IC for short), for example, may include a single packaged IC, or may include multiple packaged ICs with a same function or different functions. For example, the main processor 30 and coprocessor 40 may include only a central processing unit (Central Processing Unit, CPU), or may include a combination of a graphics processing unit (Graphics Processing Unit, GPU), a digital signal processor (Digital Signal Processor, DSP for short), and a control chip (for example, a baseband chip) of a communications unit. In this embodiment of the present invention, the CPU may be a single-core processor or a multi-core processor.

The main processor 30 has higher power consumption due to its greater processing capability and more complex circuit structure. The coprocessor has lower power consumption due to its weaker processing capability and simpler circuit structure. For example, the coprocessor may include a microcontroller unit (Microcontroller Unit, MCU), or may be implemented by using a sensor hub (Sensor Hub) technology. The first storage unit 50 is configured to provide the main processor 30 with a storage capacity required for code storage and processing.

The coprocessor 40 includes a second buffer 41, configured to buffer user position change information that is obtained by processing the physical data output by the sensor module. The second storage unit 43 is configured to provide the coprocessor 40 with a storage capacity required in a code storage and processing process. The first storage unit 50 and the second storage unit 43 may be configured to store a software program and a module. The main processor 30 and the coprocessor 40 run the software program and the module stored in the first storage unit 50 and the second storage unit 43, to implement various functions and applications of the mobile terminal and implement data processing. The first storage unit 50 and the second storage unit 43 include a program storage area and a data storage area. The program storage area may store an operating system, and an application program required for at least one function, such as an audio playback program and an image playback program. The data storage area may store data created during the use of the mobile terminal (such as audio data and a phone book), and so on. In this embodiment of the present invention, the first storage unit 50 and the second storage unit 43 may include a volatile memory, such as a nonvolatile dynamic random access memory (Nonvolatile Random Access Memory, NVRAM), a phase-change random access memory (Phase Change RAM, PRAM), and a magnetoresistive random access memory (Magetoresistive RAM, MRAM); and may include a nonvolatile memory, such as at least one disk storage device, an electrically erasable programmable read-only memory (Electrically Erasable Programmable Read-Only Memory, EEPROM), and a flash memory device, such as a NOR flash memory (NOR flash memory) or a NAND flash memory (NAND flash memory). The nonvolatile memory stores the operating system and the application program executed by the main processor 30 and the coprocessor 40. The main processor 30 and the coprocessor 40 load a running program and data from the nonvolatile memory into a memory and store digital content in a large-capacity storage apparatus. The operating system includes various components and/or drivers that are used to control and manage a conventional system task, such as memory management, storage device control, and power management, and that facilitate communication between various hardware and software. In this embodiment of the present invention, the operating system may be the Android system of Google, the iOS system developed by Apple, the Windows operating system developed by the Microsoft Corporation, or the like, or an embedded operating system such as Vxworks.

A buffer is a type of storage unit, can be quickly read and written, and is generally implemented by using a register circuit. The first buffer 11 is configured to buffer data that the GNSS receiver 10 needs to transmit to the main processor 30. The second buffer 41 is configured to buffer data that the coprocessor 40 needs to transmit to the main processor 40.

Figure 2:
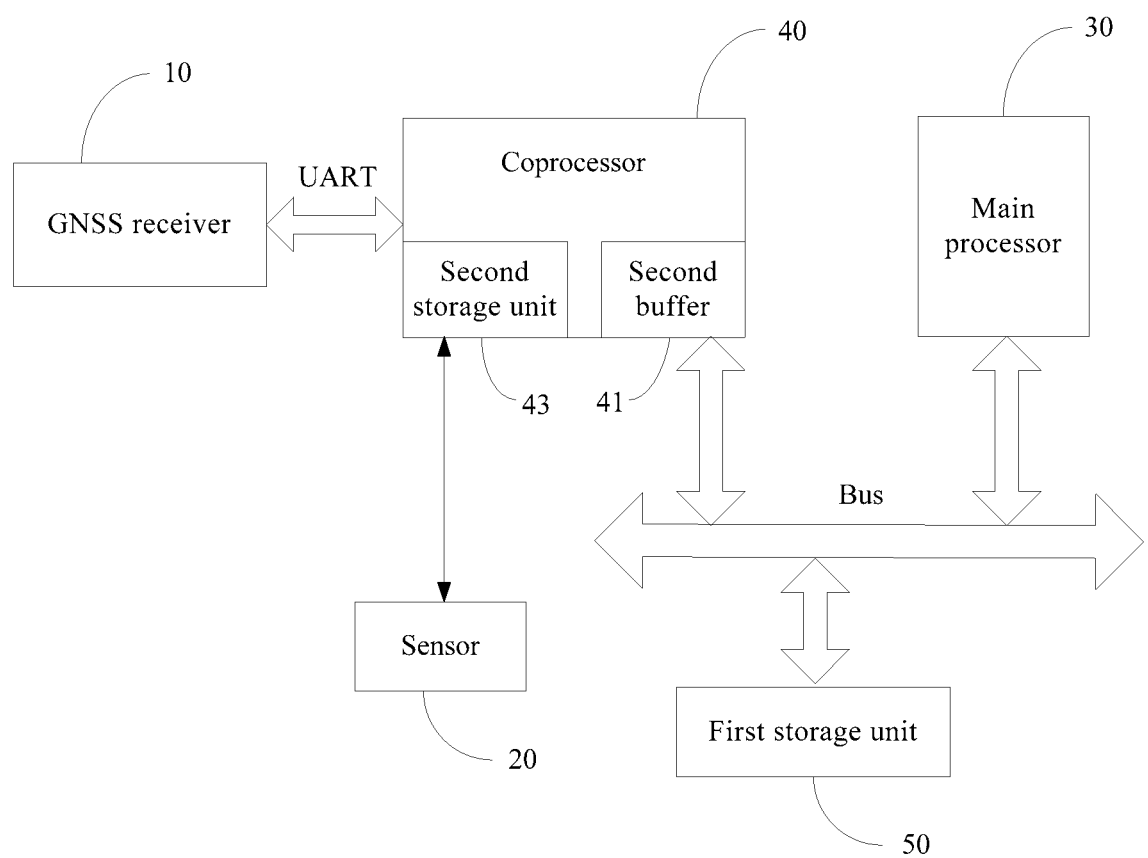
FIG. 2 is a schematic diagram of a frame structure of another mobile terminal according to an embodiment of the present invention.

FIG. 2 is a schematic diagram of a frame structure of another mobile terminal according to an embodiment of the present invention. Referring to FIG. 2, on the basis of the mobile terminal provided in the embodiment shown in FIG. 1, a GNSS receiver 10 is not connected to a main processor 30 by using a bus, but is directly connected to a coprocessor 40 by using a transmission circuit. For example, the transmission circuit may be a universal asynchronous receiver/transmitter (Universal Asynchronous Receiver/Transmitter, UART).

The mobile terminal shown in FIG. 1 receives, by using a GNSS receiver 10, a navigation signal sent by a GNSS navigation satellite, calculates data such as a pseudorange, a navigation message, and a signal strength according to the navigation signal, and buffers the data into a first buffer 11 of the GNSS receiver 10. During processing, a main processor 30 reads the data such as the pseudorange, the navigation message, and the signal strength from the first buffer 11 and calculates corresponding position coordinates of a user.

Compared with the mobile terminal shown in FIG. 1, no first buffer is provided in the GNSS receiver 10 of the mobile terminal shown in FIG. 2. After receiving a navigation signal transmitted from a GNSS navigation satellite and calculating data such as a pseudorange, a navigation message, and a signal strength according to the navigation signal, the GNSS receiver 10 does not buffer the data, but directly transmits the data to a coprocessor 40 by using a transmission circuit. The coprocessor 40 calculates position coordinates of a user in real time according to the data such as the pseudorange, the navigation message, and the signal strength, and buffers the position coordinates of the user into a second buffer 41 of the coprocessor 40.

The embodiments of the present invention may be applied to a non-real-time positioning scenario. For example, when a user is running, a mobile phone may be used to record a running track. During a process of recording, the mobile phone may be in a screen-off (screen-turnoff) state, that is, a main processor is in a sleep state. In this case, the phone does not calculate a current position in real time but buffers GNSS and DR data, and after the main processor is woken up, calculates coordinates of a running track of the user according to the buffered data.

The technical solutions of the present invention are described in detail with reference to specific embodiments below. The following specific embodiments may be combined with each other, and a same or similar concept or process may not be repeated in some embodiments.

Figure 3:
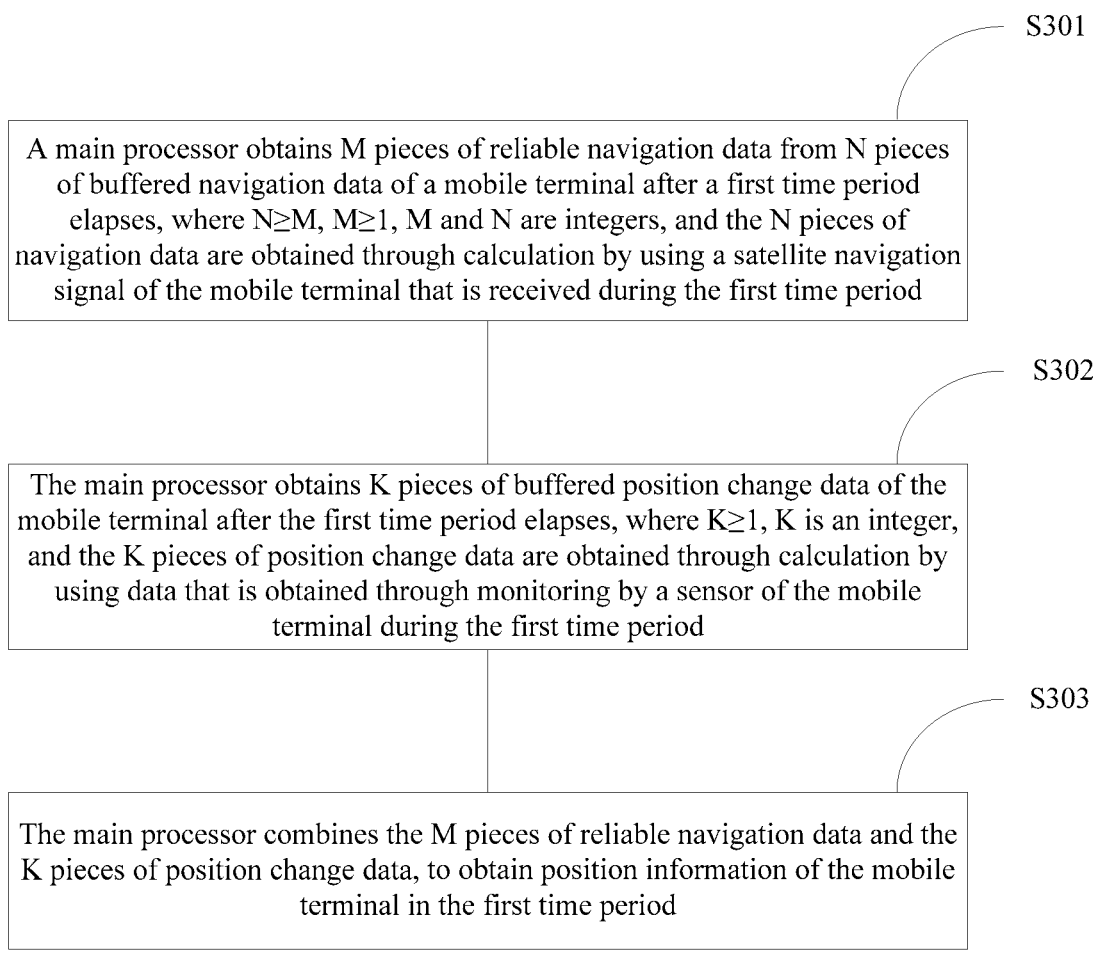
FIG. 3 is a schematic flowchart of a positioning method for a mobile terminal according to an embodiment of the present invention.

FIG. 3 is a schematic flowchart of a positioning method for a mobile terminal according to an embodiment of the present invention. The positioning method shown in FIG. 3 can be implemented by the mobile terminal shown in FIG. 1 or FIG. 2. Referring to FIG. 3, in this embodiment of the present invention, the mobile terminal includes a main processor, and the method includes the following steps.

S301. The main processor obtains M pieces of reliable navigation data from N pieces of buffered navigation data of the mobile terminal after a first time period elapses, where $N \geq M$, $M \geq 1$, M and N are integers, and the N pieces of navigation data are obtained through calculation by using a satellite navigation signal of the mobile terminal that is received during the first time period.

Specifically, the navigation data may be intermediate data, such as a pseudorange, a navigation message, a signal strength, and other data, obtained through calculation according to the satellite signal. The intermediate data is used to calculate final position coordinates. Alternatively, the navigation data may be position coordinates obtained through calculation according to the satellite signal. The position coordinates may be latitude and longitude coordinates or may be another coordinate form that can represent a position of the mobile terminal.

When the navigation data is intermediate data, such as a pseudorange, a navigation message, and a signal strength, the positioning method shown in FIG. 3 may be implemented by the mobile terminal shown in FIG. 1. Specifically, a GNSS receiver 10 receives the satellite navigation signal of the mobile terminal during the first time period, calculates data such as a pseudorange, a navigation message, and a signal strength according to the satellite navigation signal, and buffers the data such as the pseudorange, the navigation message, and the signal strength into a first buffer 11. A main processor 30 may calculate position coordinates corresponding to the mobile terminal according to the data such as the pseudorange, the navigation message, and the signal strength.

When the navigation data is position coordinates, the positioning method shown in FIG. 3 may be implemented by the mobile terminal shown in FIG. 2. Specifically, a GNSS receiver 10 receives the satellite navigation signal of the mobile terminal during the first time period, and calculates intermediate data, such as a pseudorange, a navigation message, and a signal strength according to the satellite navigation signal. A coprocessor 40 calculates position coordinates corresponding to the mobile terminal according to the data such as the pseudorange, the navigation message, and the signal strength, and buffers the position coordinates into a second buffer 41.

Specifically, during the first time period, the GNSS receiver 10 may intermittently calculate the data such as the pseudorange, the navigation message, and the signal strength, for example, once every 1s or 5 s. Therefore, navigation data at multiple time points is obtained correspondingly during the first time period. When a moment corresponding to the navigation data is obtained, information about the moment may be obtained according to the satellite navigation signal, or the moment corresponding to the navigation data may be marked by using a clock signal (for example, a clock of the coprocessor 40), that is a time stamp, of a system.

The N pieces of navigation data in the first time period are buffered. After a first moment following the first time period elapses, the main processor may obtain the M pieces of reliable navigation data from the N pieces of buffered navigation data. The first moment may be the last moment of the first time period. That is, after the first time period elapses, the main processor 30 may read the buffered navigation data. A signal strength of the satellite signal received by the GNSS receiver 10 may be unstable. When the signal strength of the satellite signal is relatively strong, the navigation data obtained through calculation according to the satellite signal is accurate, that is, reliable. When the signal strength of the satellite signal is relatively weak, the navigation data obtained through calculation according to the satellite signal may be inaccurate, that is, unreliable. Therefore, the main processor 30 obtains the M pieces of reliable navigation data when reading the buffered navigation data.

During a process in which the navigation data is buffered, the main processor 30 may be in a sleep state to reduce power consumption. Then the main processor 30 may process the buffered navigation data after being woken up. Specifically, there may be multiple states for the main processor 30. For example, the main processor 30 is in a sleep state before the first moment, and the main processor 30 is woken up at the first moment. After being woken up, the main processor 30 obtains the buffered navigation data. If the first moment is the last moment of the first time period, the main processor 30 is in a sleep state during the first time period, and the main processor 30 is woken up after the first time period elapses. After being woken up, the main processor 30 obtains the buffered navigation data.

Specifically, the main processor 30 may be woken up periodically, or may be woken up by a set trigger condition. For example, the main processor is woken up when a screen of the mobile terminal is turned on, or the main processor is woken up after a positioning process ends.

S302. The main processor obtains K pieces of buffered position change data of the mobile terminal after the first time period elapses, where K≥1, K is an integer, and the K pieces of position change data are obtained through calculation by using data that is obtained through monitoring by a sensor of the mobile terminal during the first time period.

Specifically, during the first time period, the sensor 20 monitors movement data (for example, observation data of an accelerometer, a gyroscope, or a magnetic field sensor) of the mobile apparatus, and transmits the movement data obtained through monitoring to the coprocessor 40. A DR module runs in the coprocessing unit. The DR module calculates the K pieces of position change data (including a moving direction change and a distance between adjacent moments) of the mobile terminal according to the data obtained by the sensor through monitoring, that is, performs dead reckoning DR; and buffers the K pieces of position change data into the second buffer 41. The dead reckoning DR may also be performed intermittently, for example, once every is or 5 s, so that position change data of the mobile terminal between two adjacent calculation moments can be obtained. The coprocessor may record each calculation moment by using a clock circuit, and records corresponding calculation moments, that is, time stamps, when saving the K pieces of position change data. The time stamps together with the K pieces of position change data are buffered into the second buffer 41.

During a process in which the K pieces of position change data are buffered, the main processor 30 may be in a sleep state to reduce power consumption. When being woken up, the main processor 30 may process the buffered K pieces of position change data.

Optionally, during the dead reckoning DR process, the position change data may be calculated at a fixed time interval, or may be calculated when a set condition is satisfied. For example, when it is detected that a moving distance of the mobile terminal exceeds a set threshold, the position change data of the mobile terminal is calculated. Alternatively, whether the position change data of the mobile terminal needs to be calculated may be determined according to a time interval and a spatial moving distance. For example, both a time interval threshold and a spatial moving distance threshold are set, and when any one of the threshold conditions is satisfied, the position change data may be calculated.

Optionally, a clock circuit of the GNSS receiver may be asynchronous with the clock circuit of the coprocessor. The N pieces of navigation data and the corresponding time stamps are saved in the first buffer 11 of the GNSS receiver 10. The K pieces of position change data and the corresponding time stamps are stored in the second buffer 41 of the coprocessor 40.

Optionally, clock synchronization between the GNSS receiver 10 and the coprocessor 40 may be implemented by using a synchronous clock circuit. In this case, the time stamps corresponding to the N pieces of navigation data and the time stamps corresponding to the K pieces of position change data do not need to be saved.

It should be noted that in this embodiment of the present invention, an execution order of step S301 and step S302 is not limited. Step S301 may be executed first, or step S302 may be executed first, or the two steps may be executed at the same time. In addition, during the first time period, no limitation is set to an execution order for the GNSS receiver to obtain the satellite navigation signal and the sensor to monitor the movement data of the mobile terminal.

S303. The main processor combines the M pieces of reliable navigation data and the K pieces of position change data, to obtain position information of the mobile terminal in the first time period.

To improve positioning accuracy of the mobile terminal while ensuring that the mobile terminal can normally perform positioning, the main processor combines the M pieces of reliable navigation data and the K pieces of position change data.

Specifically, the main processor obtains reliable navigation data and position change data that match each other from the M pieces of reliable navigation data and the K pieces of position change data. The main processor combines the reliable navigation data and the position change data that match each other, and in combination with position change data that is not combined, obtains the position information of the mobile terminal in the first time period.

A quantity of the reliable navigation data may be equal to or less than a quantity of the position change data. When the quantity of the reliable navigation data is equal to the quantity of the position change data and each of the navigation data matches one piece of position change data, a quantity of the position change data that is not combined is zero. That is, fusion processing is performed on all the position change data and the matched navigation data. When the quantity of the reliable navigation data is less than the quantity of the position change data, fusion processing is performed only on the reliable navigation data and the position change data that match each other.

Specifically, each of the navigation data is corresponding to one moment, and each of the position change data is corresponding to one moment. When a moment of the $m^{th}$ piece of navigation data is the same as a moment of the $n^{th}$ piece of position change data, the $m^{th}$ piece of navigation data is set to match the $n^{th}$ piece of position change data. That a moment of the $m^{th}$ piece of navigation data is the same as a moment of the $n^{th}$ piece of position change data means that a time difference between the two moments is within an allowable error range (that is, the difference between the two moments is less than or equal to a preset threshold). If coordinate points corresponding to at least two pieces of GNSS navigation data match a same DR coordinate point corresponding to one piece of position change data, only a coordinate point corresponding to one piece of the GNSS navigation data is reserved. To reduce power consumption, a calculation time interval of the GNSS navigation data may be longer than a calculation interval of the position change data, or a calculation time interval of the GNSS navigation data may be a multiple of a calculation interval of the position change data.

During a process in which the main processor matches the M pieces of reliable navigation data with the K pieces of position change data, optionally, when the clock circuit of the GNSS receiver is asynchronous with the clock circuit of the coprocessor, the main processor performs matching according to the time stamps corresponding to the M pieces of reliable navigation data in the first buffer and the time stamps of the K pieces of position change data in the second buffer, and combines navigation data and position change data whose time stamps are equal or the closest.

Optionally, when the clock circuit of the GNSS receiver is synchronous with the clock circuit of the coprocessor, the main processor may directly combine the navigation data and position change data that are at a same moment, without performing matching by using time stamps. Specifically, when the navigation data is position coordinates obtained through calculation according to the satellite navigation signal of the mobile terminal, that the main processor combines the reliable navigation data and the position change data that match each other may be implemented in but not limited to the following implementation manners.

After the main processor obtains the navigation data and the position change data that match each other, a Kalman filtering process is established according to a time point corresponding to the position change data. A specific process of performing, according to Kalman filtering, fusion processing on the reliable navigation data and the position change data that match each other is as follows.

A variation between position coordinates of the user at two moments can be obtained during the DR process, and a state equation for the Kalman filtering can be obtained accordingly:

$$X_{k+1} = F_k \cdot X_k$$

where X is a to-be-estimated vector in the Kalman filtering, and may specifically include user coordinates, a user movement direction, and the like; k represents a moment corresponding to the to-be-estimated vector; and $F_k$ reflects a change relationship of the vector X at two adjacent moments (which are the $k^{th}$ moment and the $(k+1)^{th}$ moment, where the $k^{th}$ moment is prior to the $(k+1)^{th}$ moment), and $F_k$ is a matrix and may be obtained according to an output result of the DR module.

In addition, if at the $k^{th}$ moment, there is reliable navigation data matching the position change data, the reliable navigation data at the $k^{th}$ moment is marked as an observation vector $Z_k$, and an observation equation may be established:

$$Z_k = H_k \cdot X_k$$

where $H_k$ represents a coefficient matrix of the observation equation at the $k^{th}$ moment.

In this embodiment of the present invention, the Kalman filtering process of combining the reliable navigation data and the position change data that match each other may be established as follows:

(1) Initialize Kalman filtering parameters: $X_0$ and $P_0$. $X_0$ represents an initial value of the to-be-estimated vector, and $P_0$ represents a mean square error matrix of $X_0$ upon initialization.

(2) Perform one-step prediction: $X_{k+1/k} = F_x \cdot X_k$, where $X_{k+1/k}$ represents a prediction vector, at the $(k+1)^{th}$ moment, obtained according to a to-be-estimated vector at the $k^{th}$ moment.

(3) Perform one-step prediction of a mean square error matrix: $P_{k+1/k} = F_k \cdot P_k \cdot F_k^T + Q_k$, where $P_k$ represents a mean square error matrix of $X_k$ at the $k^{th}$ moment; $P_{k+1/k}$ represents a predicted mean square error matrix, at the $(k+1)^{th}$ moment, obtained according to the mean square error matrix at the $k^{th}$ moment; $F_k^T$ represents a transposed matrix of $F_k$; and $Q_k$ represents a noise covariance matrix of a Kalman filtering system, and is used to indicate a reliability level of the state equation.

(4) Calculate a filter gain: $K_{k+1} = P_{k+1/k} \cdot H_{k+1}^T \cdot (H_{k+1} \cdot P_{k+1/k} \cdot H_{k+1}^T + R_{k+1})^{-1}$ where $K_{k+1}$ represents a filter gain of the Kalman filtering system at the $(k+1)^{th}$ moment; $H_{k+1}^T$ represents a transposed matrix of $H_{k+1}$; and $R_{k+1}$ represents an observed noise covariance at the $(k+1)^{th}$ moment, and is used to indicate a reliability level of the observation equation.

(5) Calculate a result that is to be obtained after the reliable navigation data and the position change data that match each other are combined: $X_{k+1} = X_{k+1/k} + K_{k+1} \cdot (Z_{k+1} - H_{k+1} \cdot X_{k+1/k})$.

(6) Update the mean square error matrix: $P_{k+1} = (I - K_{k+1} \cdot H_{k+1}) \cdot P_{k+1/k}$, where I is an identity matrix.

If at the $(k+1)^{th}$ moment, there is no reliable navigation data matching the position change data, a process of establishing, according to the Kalman filter state equation, a Kalman filtering process for the position change data that is not combined is as follows in this embodiment of the present invention:

(1) Perform one-step prediction: $X_{k+1/k} = F_k \cdot X_k$, where $X_{k+1/k}$ represents a prediction vector, at the $(k+1)^{th}$ moment, obtained according to a to-be-estimated vector at the $k^{th}$ moment.

(2) Perform one-step prediction of a mean square error matrix: $P_{k+1/k} = F_k \cdot P_k \cdot F_k^T + Q_k$ where $P_k$ represents a mean square error matrix of $X_k$ at the $k^{th}$ moment; $P_{k+1/k}$ represents a predicted mean square error matrix, at the $(k+1)^{th}$ moment, obtained according to the mean square error matrix at the $k^{th}$ moment; $F_k^T$ represents a transposed matrix of $F_k$; and $Q_k$ represents a noise covariance matrix of a Kalman filtering system, and is used to indicate a reliability level of the state equation.

(3) Update a result of the to-be-estimated vector: $X_{k+1}=X_{k+1/k}$.

(4) Update the mean square error matrix: $P_{k+1}=P_{k+1/k}$.

During the process of combining the reliable navigation data and the position change data that match each other, the GNSS receiver and the DR module may have but not limited to the following operating manners.

One operating manner of the GNSS receiver is: the GNSS receiver and the DR module are on during the entire process to calculate corresponding navigation data and position change data.

Another operating manner of the GNSS receiver is: the DR module is on during the entire process and the GNSS receiver is intermittently turned on (as shown in FIG. 4). FIG. 4 is a schematic diagram of an operating manner of a GNSS receiver and a DR module according to an embodiment of the present invention. Referring to FIG. 4, during the process in which the main processor combines the reliable navigation data and the position change data that match each other, the DR module is on during the entire process, while the GNSS receiver enters a sleep state or a low-power-consumption state after being on for a period of time. In addition, a step of turning on the GNSS receiver at the beginning of each time period is added. When the DR module is persistently on, an operating status of the GNSS receiver is relatively flexible, and the GNSS receiver may be in an operating state and a sleep state alternately according to a preset rule. For example, when both the DR module and the GNSS receiver are on during a period of time, the main processor may combine the navigation data and the position change data that match each other. When the DR module is on while the GNSS receiver sleeps during a period of time, the main processor obtains the position information of the mobile terminal by using only the position change data.

Still another operating manner is: the GNSS receiver and the DR module are alternately on, that is, the navigation data and the position change data are calculated alternately. In this case, there is no need to match the navigation data with the position change data or perform Kalman filtering. When there is only the navigation data, the position coordinate point is obtained according to the navigation data. When there is only the position change data, the position coordinate point is obtained through recurrence according to a position coordinate point at a previous moment.

Specifically, in step 303, when the navigation data is data that is obtained through calculation by using the satellite navigation signal of the mobile terminal and from which position coordinates are to be calculated, the combining, by the main processor, the M pieces of reliable navigation data and the K pieces of position change data, to obtain position information of the mobile terminal in the first time period includes:

obtaining, by the main processor through calculation, M position coordinates according to the M pieces of reliable navigation data; and combining, by the main processor, the M position coordinates and the K pieces of position change data, to obtain the position information of the mobile terminal in the first time period.

When the navigation data is intermediate data (such as a pseudo-code, a navigation message, and a signal strength) that is obtained through calculation by using the satellite navigation signal of the mobile terminal and from which position coordinates are to be calculated, the main processor cannot directly combine the intermediate data and the position change data. The main processor first calculates corresponding position coordinates from the reliable navigation data before performing fusion processing, and then combines the M position coordinates and the K pieces of position change data by using Kalman filtering, to obtain the position information of the mobile terminal in the first time period. A specific fusion process is the same as that in the foregoing method, and details are not described again herein.

Specifically, the position information of the mobile terminal in the first time period includes at least two position coordinates, and each of the position coordinates is corresponding to one moment of the first time period.

After step S303, this embodiment may further include the following step.

S304. The main processor enters a sleep state after obtaining the position information of the mobile terminal in the first time period.

After obtaining the position information of the mobile terminal, if no other task needs to be processed, the main processor may enter a sleep state to reduce power consumption.

In this embodiment of the present invention, N pieces of navigation data and K pieces of position change data that are obtained during a first time period are separately buffered. A main processor may obtain the K pieces of position change data after the first time period elapses, obtain M pieces of reliable navigation data from the N pieces of buffered navigation data, and combine the reliable navigation data and the position change data, to obtain position information of a mobile terminal. During a process of obtaining the N pieces of navigation data and the K pieces of position change data, the main processor does not need to be turned on in real time, thereby reducing positioning power consumption of a system.

Specifically, that the main processor obtains M pieces of reliable navigation data from N pieces of buffered navigation data of the mobile terminal in step S101 may be implemented in but not limited to the following two possible implementation manners.

Figure 5:
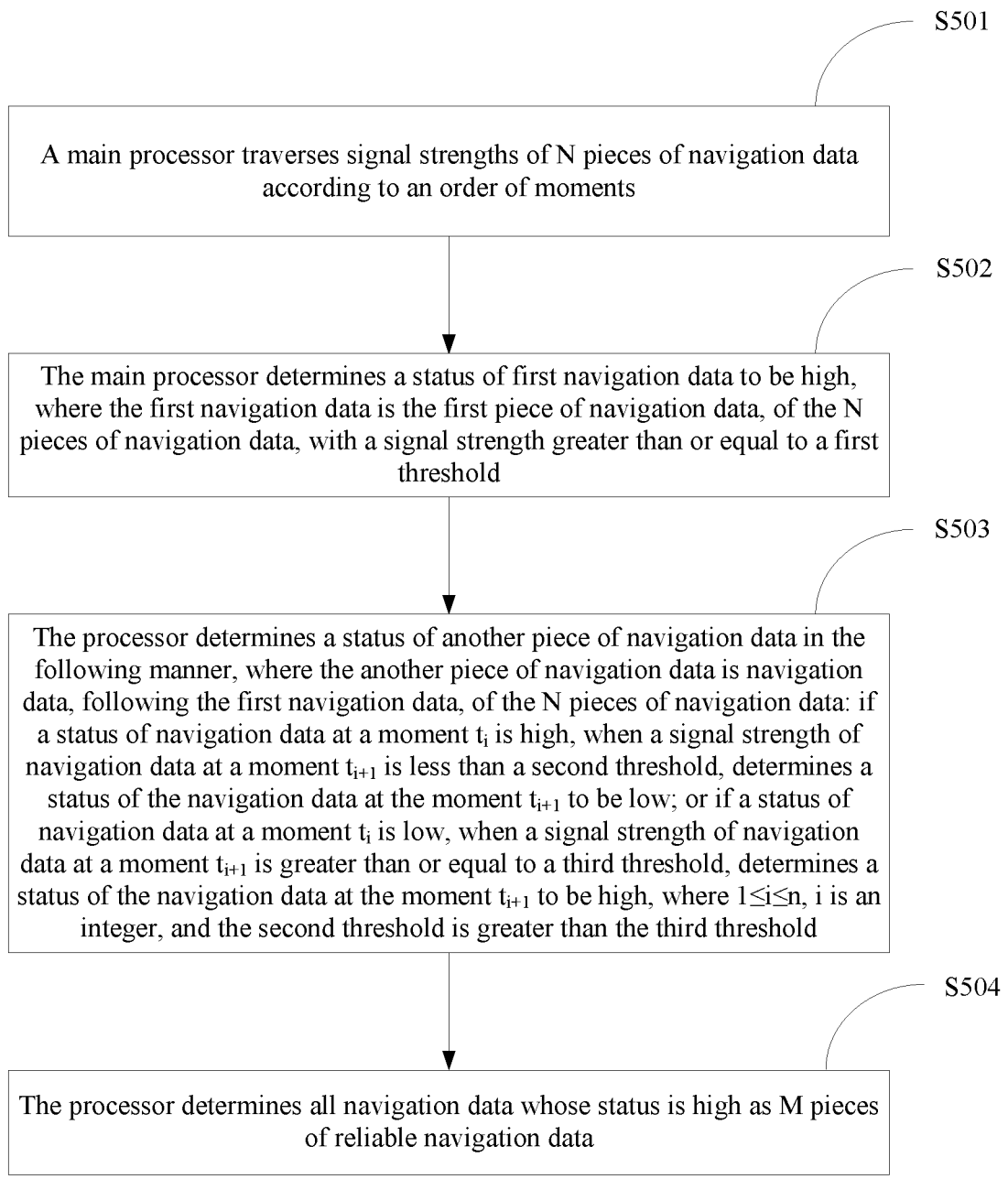
FIG. 5 is a schematic flowchart of a method for obtaining reliable navigation data according to an embodiment of the present invention.
Figure 6:
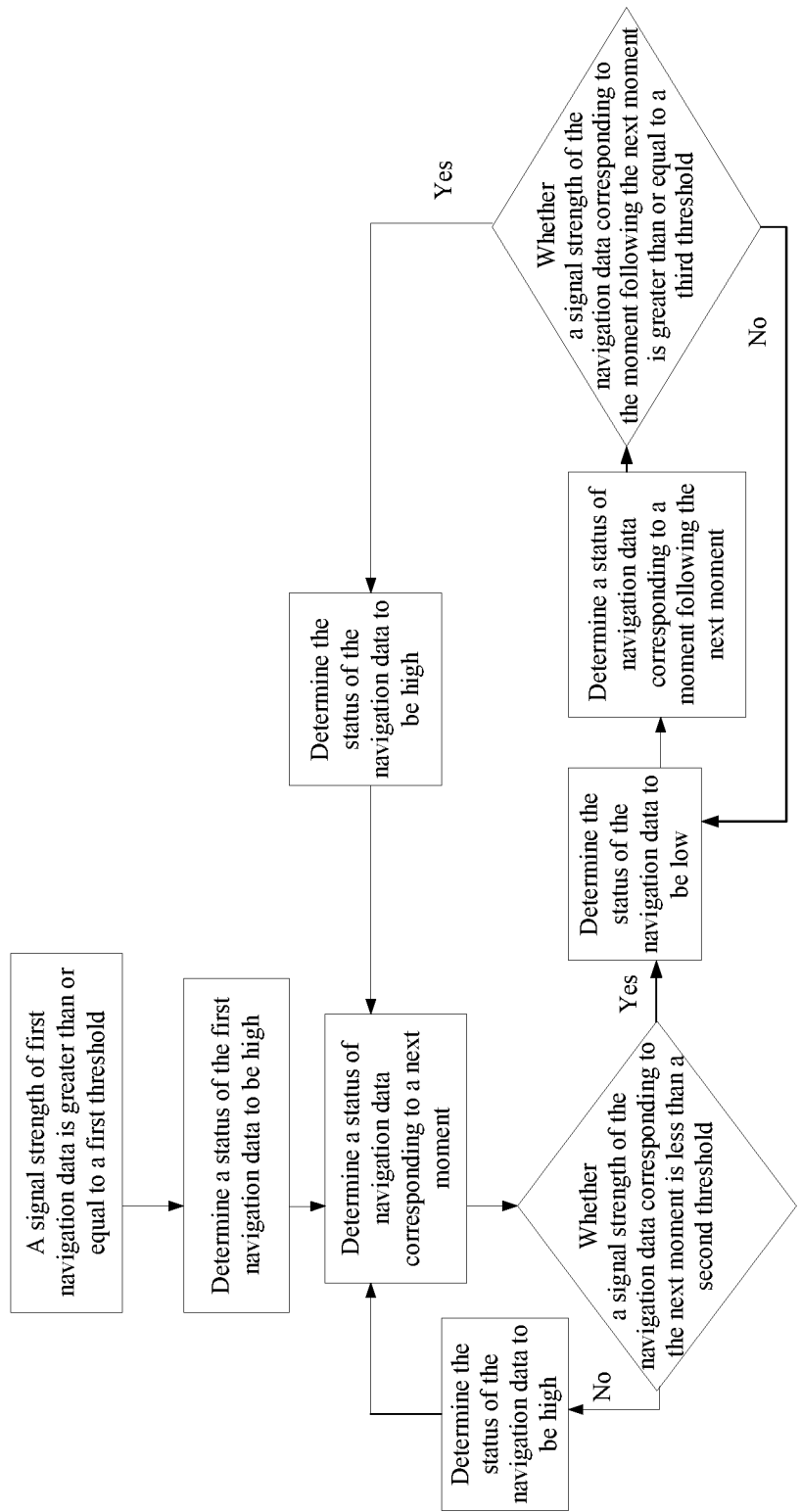
FIG. 6 is a schematic flowchart of a specific implementation manner of the method for obtaining reliable navigation data in FIG. 5.

FIG. 5 is a schematic flowchart of a method for obtaining reliable navigation data according to an embodiment of the present invention. FIG. 6 is a schematic flowchart of a specific implementation manner of the method for obtaining reliable navigation data in FIG. 5. Referring to FIG. 5 and FIG. 6, in a possible implementation manner, a status of navigation data prior to the first time period is not determined or there is no buffered navigation data prior to the first time period. As described in FIG. 5 and FIG. 6, that the main processor obtains M pieces of reliable navigation data from N pieces of buffered navigation data of the mobile terminal includes the following steps.

S501. The main processor traverses signal strengths of the N pieces of navigation data according to an order of moments.

Each of the N pieces of navigation data is corresponding to one moment and one signal strength. The N pieces of navigation data are corresponding to moments $t_1, t_2, \ldots,$ and $t_N$ respectively according to the order of the moments.

Specifically, the order of the moments means that according to a time order of the moments, a moment that comes earlier is a previous moment, and a moment that comes later is a latter moment.

S502. The main processor determines a status of first navigation data to be high, where the first navigation data is the first piece of navigation data, of the N pieces of navigation data, with a signal strength greater than or equal to a first threshold.

The status of the navigation data prior to the first time period is not determined or there is no buffered navigation data prior to the first time period. The main processor 30 determines the first navigation data according to the first threshold, so as to determine, according to the first navigation data, a status of navigation data following the first navigation data. The first threshold may be set in advance. Specifically, the main processor 30 determines the signal strengths of the N pieces of navigation data according to the order of the moments (as shown in FIG. 6). During a process of the determining, a status of navigation data that is the first piece of navigation data with a signal strength greater than or equal to the first threshold is determined to be high, and the navigation data is determined as the first navigation data.

Specifically, during GNSS navigation, the GNSS receiver 10 receives signals from more than one satellite, each satellite signal is corresponding to one signal strength, and the signal strength is generally indicated by using a signal-to-noise ratio or a carrier-to-noise ratio. When a signal strength of navigation data received at a moment (for example, a moment $T_a$) is calculated, an average value of satellite signal strengths in resolution at the moment $T_a$ may be calculated; or a minimum value of satellite signal strengths in resolution at the moment $T_a$ may be calculated; or an average value of signal strengths of A satellites may be calculated, or a minimum value of signal strengths of A satellites may be calculated. The A satellites are the first A satellites of all visible satellites in descending order of signal strengths, A is not greater than B, and B is a quantity of all the visible satellites at the moment $T_a$. The visible satellite is a satellite from which the GNSS receiver 10 can receive a navigation signal.

S503. The processor determines a status of another piece of navigation data in the following manner, where the another piece of navigation data is navigation data, following the first navigation data, of the N pieces of navigation data: if a status of navigation data at a moment $t_i$ is high, when a signal strength of navigation data at a moment $t_{i+1}$ is less than a second threshold, determines a status of the navigation data at the moment $t_{i+1}$ to be low; or if a status of navigation data at a moment $t_i$ is low, when a signal strength of navigation data at a moment $t_{i+1}$ is greater than or equal to a third threshold, determines a status of the navigation data at the moment $t_{i+1}$ to be high, where $1 \leq i \leq n$, i is an integer, and the second threshold is greater than the third threshold.

Specifically, when determining the status of the navigation data following the first navigation data, the processor may determine a status of navigation data at a next moment according to the status of the first navigation data, the second threshold, and the third threshold. A status of each navigation data at a next moment may be determined according to a status of navigation data at a current moment. For example, assuming that a status of navigation data at a moment $t_2$ is determined to be high, whether a signal strength of navigation data at a moment $t_3$ is less than the second threshold is determined. If the signal strength of the navigation data at the moment $t_3$ is less than the second threshold, a status of the navigation data at the moment $t_3$ is determined to be low. If the signal strength of the navigation data at the moment $t_3$ is not less than the second threshold, a status of the navigation data at the moment $t_3$ is determined to be high. Assuming that a status of navigation data at a moment $t_2$ is determined to be low, whether a signal strength of navigation data at a moment $t_3$ is greater than the third threshold is determined. If the signal strength of the navigation data at the moment $t_3$ is greater than the third threshold, a status of the navigation data at the moment $t_3$ is determined to be high. If the signal strength of the navigation data at the moment $t_3$ is not greater than the third threshold, a status of the navigation data at the moment $t_3$ is determined to be low.

Specifically, when the mobile terminal enters a building, a navigation signal is easily blocked. Therefore, a relatively high second threshold needs to be set, so that GNSS navigation data whose navigation signal strength is not strong enough is discarded as soon as possible, and the position change data of the mobile terminal obtained by using DR is used. In this way, it is ensured that the mobile terminal can implement normal positioning. Similarly, when the mobile terminal leaves the building, because an accumulative error of the position change data of the mobile terminal obtained by using the DR is relatively large, a relatively low third threshold needs to be set. That is, the third threshold needs to be set less than the second threshold, so that the GNSS navigation data can be combined as soon as possible, to ensure positioning accuracy of the mobile terminal. Optionally, the second threshold may be the same as the first threshold, or may be different from the first threshold.

S504. The processor determines all navigation data whose status is high as the M pieces of reliable navigation data.

Figure 7:
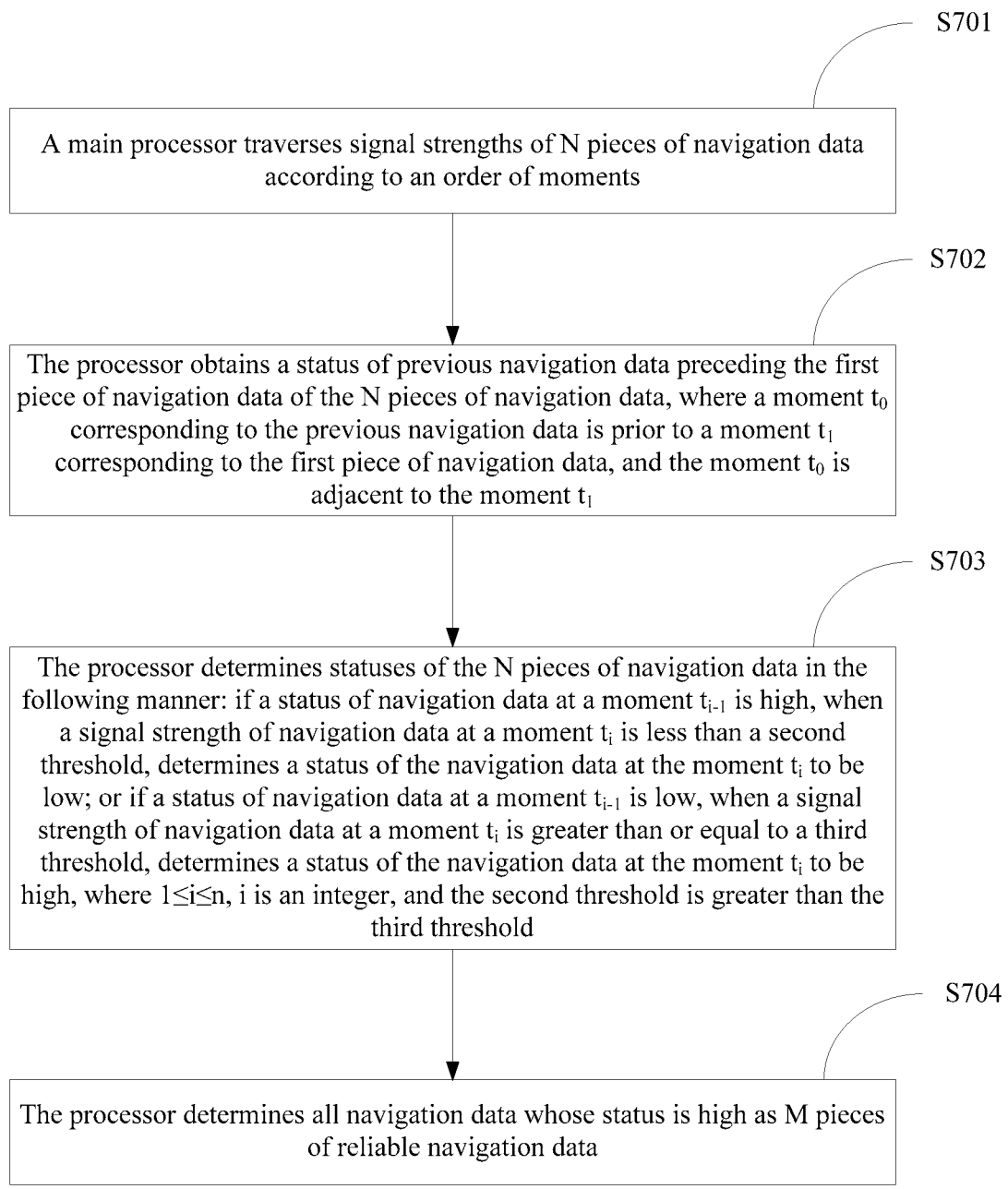
FIG. 7 is a schematic flowchart of another method for obtaining reliable navigation data according to an embodiment of the present invention.

FIG. 7 is a schematic flowchart of another method for obtaining reliable navigation data according to an embodiment of the present invention. In another possible implementation manner, there is navigation data preceding the first piece of navigation data in the first time period, and a status of the navigation data preceding the first piece of navigation data in the first time period is determined. That the main processor obtains M pieces of reliable navigation data from N pieces of buffered navigation data of the mobile terminal includes the following steps.

S701. The main processor traverses signal strengths of the N pieces of navigation data according to an order of moments.

Each of the N pieces of navigation data is corresponding to one moment and one signal strength. The N pieces of navigation data are corresponding to moments $t_1, t_2, \ldots,$ and $t_N$ respectively according to the order of the moments.

S702. The main processor obtains a status of previous navigation data preceding the first piece of navigation data of the N pieces of navigation data, where a moment $t_0$ corresponding to the previous navigation data is prior to a moment $t_1$ corresponding to the first piece of navigation data, and the moment $t_0$ is adjacent to the moment $t_1$.

S703. The main processor determines statuses of the N pieces of navigation data in the following manner: if a status of navigation data at a moment $t_{i-1}$ is high, when a signal strength of navigation data at a moment $t_i$ is less than a second threshold, determines a status of the navigation data at the moment $t_i$ to be low; or if a status of navigation data at a moment is low, when a signal strength of navigation data at a moment $t_i$ is greater than or equal to a third threshold, determines a status of the navigation data at the moment $t_i$ to be high, where $1 \leq i \leq n$, i is an integer, and the second threshold is greater than the third threshold.

The status of the previous navigation data preceding the first piece of navigation data in the first time period is determined. Therefore, the main processor may determine a status of the first piece of navigation data in the first time period according to the status of the previous navigation data, and determine a status of navigation data at a next moment according to the status of the first piece of navigation data in the first time period, and so on. Specifically, in the another implementation manner, manners for the main processor to determine the status of the first piece of navigation data according to the status of the previous navigation data and determine the status of the navigation data at the next moment according to the status of the first piece of navigation data are the same as the method described in S503, and details are not described again herein.

S704. The processor determines all navigation data whose status is high as the M pieces of reliable navigation data.

Figure 8:
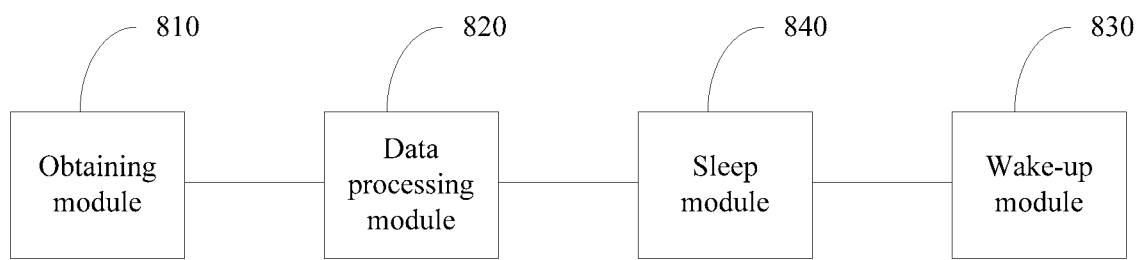
FIG. 8 is a schematic structural diagram of a positioning apparatus for a mobile terminal according to an embodiment of the present invention.

An embodiment of the present invention further provides a positioning apparatus for a mobile terminal. FIG. 8 is a schematic structural diagram of a positioning apparatus for a mobile terminal according to an embodiment of the present invention. Referring to FIG. 8, the positioning apparatus includes at least an obtaining module 810 and a data processing module 820.

Specifically, the obtaining module 810 is configured to obtain M pieces of reliable navigation data from N pieces of buffered navigation data of the mobile terminal after a first time period elapses, where N≥M, M≥1, M and N are integers, and the N pieces of navigation data are obtained through calculation by using a satellite navigation signal of the mobile terminal that is received during the first time period.

The obtaining module 810 is further configured to obtain K pieces of buffered position change data of the mobile terminal after the first time period elapses, where K≥1, K is an integer, and the K pieces of position change data are obtained through calculation by using data that is obtained through monitoring by a sensor of the mobile terminal during the first time period.

The data processing module 820 is configured to combine the M pieces of reliable navigation data and the K pieces of position change data, to obtain position information of the mobile terminal in the first time period.

Optionally, each of the N pieces of navigation data is corresponding to one moment and one signal strength, and the N pieces of navigation data are corresponding to moments $t_1, t_2, \ldots$, and $t_N$ respectively according to an order of the moments.

The obtaining module 810 is specifically configured to:

traverse signal strengths of the N pieces of navigation data according to the order of the moments;

determine a status of first navigation data to be high, where the first navigation data is the first piece of navigation data, of the N pieces of navigation data, with a signal strength greater than or equal to a first threshold;

determine a status of another piece of navigation data in the following manner, where the another piece of navigation data is navigation data, following the first navigation data, of the N pieces of navigation data: if a status of navigation data at a moment $t_i$ is high, when a signal strength of navigation data at a moment $t_{i+1}$ is less than a second threshold, determine a status of the navigation data at the moment $t_{i+1}$ to be low; or if a status of navigation data at a moment $t_1$ is low, when a signal strength of navigation data at a moment $t_{i+1}$ is greater than or equal to a third threshold, determine a status of the navigation data at the moment $t_{i+1}$ to be high, where 1≤i≤n, i is an integer, and the second threshold is greater than the third threshold; and determine all navigation data whose status is high as the M pieces of reliable navigation data.

Optionally, each of the N pieces of navigation data is corresponding to one moment and one signal strength, and the N pieces of navigation data are corresponding to moments $t_1, t_2, \ldots$, and $t_N$ respectively according to an order of the moments.

The obtaining module 810 is specifically configured to:

traverse signal strengths of the N pieces of navigation data according to the order of the moments; and obtain a status of previous navigation data preceding the first piece of navigation data of the N pieces of navigation data, where a moment $t_0$ corresponding to the previous navigation data is prior to the moment $t_1$ corresponding to the first piece of navigation data, and the moment $t_0$ is adjacent to the moment $t_1$;

determine statuses of the N pieces of navigation data in the following manner: if a status of navigation data at a moment $t_{i-1}$ is high, when a signal strength of navigation data at a moment $t_i$ is less than a second threshold, determine a status of the navigation data at the moment $t_i$ to be low; or if a status of navigation data at a moment $t_{i-1}$ is low, when a signal strength of navigation data at a moment $t_i$ is greater than or equal to a third threshold, determine a status of the navigation data at the moment $t_i$ to be high, where 1≤i≤n, and the second threshold is greater than the third threshold; and determine all navigation data whose status is high as the M pieces of reliable navigation data.

Optionally, each of the navigation data is corresponding to one moment, and each of the position change data is corresponding to one moment; and when a moment of the $m^{th}$ piece of navigation data is the same as a moment of the $n^{th}$ piece of position change data, the $m^{th}$ piece of navigation data is set to match the $n^{th}$ piece of position change data.

The data processing module 820 is specifically configured to:

obtain reliable navigation data and position change data that match each other from the M pieces of reliable navigation data and the K pieces of position change data; and combine the reliable navigation data and the position change data that match each other, and in combination with position change data that is not combined, obtain the position information of the mobile terminal in the first time period.

Optionally, the navigation data is data that is obtained through calculation by using the satellite navigation signal of the mobile terminal and from which position coordinates are to be calculated. The data processing module 820 is specifically configured to:

obtain through calculation M position coordinates according to the M pieces of reliable navigation data; and combine the M position coordinates and the K pieces of position change data, to obtain the position information of the mobile terminal in the first time period.

Optionally, the apparatus further includes:

a wake-up module 830, configured to wake up the positioning apparatus after the first time period elapses; where the positioning apparatus is in a sleep state during the first time period.

Optionally, the apparatus further includes:

a sleep module 840, configured to enable the positioning apparatus to enter a sleep state after the position information of the mobile terminal in the first time period is obtained.

The positioning apparatus for a mobile terminal provided in this embodiment of the present invention is specifically configured to execute the technical solutions provided in the method embodiments. Implementation principles and effects thereof are similar to those of the method embodiments, and details are not described again herein.

An embodiment of the present invention further provides a mobile terminal. Referring to FIG. 1 and FIG. 2, the mobile terminal includes at least a main processor 30, a global navigation satellite system GNSS receiver 10, a sensor 20, and a coprocessor 40.

The main processor 30 is configured to execute the methods described in the method embodiments.

The GNSS receiver 10 is configured to: receive a satellite navigation signal of the mobile terminal during a first time period, and calculate navigation data from the satellite navigation signal, where the navigation data is data from which position coordinates are to be calculated or the navigation data is position coordinates.

The sensor 20 is configured to monitor movement data of the mobile terminal during the first time period.

The coprocessor 40 is configured to obtain through calculation K pieces of position change data according to the movement data that is obtained by the sensor 20 through monitoring. Alternatively, the coprocessor 40 is configured to: obtain through calculation K pieces of position change data according to the movement data that is obtained by the sensor through monitoring, and calculate the position coordinates from the navigation data.

Optionally, the first time period includes a second time period, and the GNSS receiver 10 is in a sleep state during the second time period. The sensor 20 is in a working state during the first time period.

The mobile terminal provided in this embodiment of the present invention may execute the technical solutions provided in the method embodiments. Implementation principles and effects thereof are similar to those of the method embodiments, and details are not described again herein.

A person of ordinary skill in the art may understand that all or some of the steps of the method embodiments may be implemented by a program instructing relevant hardware. The program may be stored in a storage medium that can be read by a computer, a mobile phone, or another portable apparatus. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A positioning method for a mobile terminal, wherein the mobile terminal comprises at least one processor, a sensor, and a global navigation satellite system (GNSS) receiver, and the method comprises:
   receiving, by the GNSS receiver and from one or more GNSS navigation satellites, a satellite navigation signal during a first time period;
   storing N pieces of navigation data of the mobile terminal in a first buffer, wherein N is an integer, and wherein the N pieces of navigation data are obtained through calculation by using the satellite navigation signal received during the first time period;
   monitoring, by the sensor, movement data of the mobile terminal during the first time period;
   storing K pieces of position change data of the mobile terminal in a second buffer, wherein K≥1, K is an integer, and the K pieces of position change data are obtained through calculation by using the movement data of the mobile terminal during the first time period;
   obtaining, by the at least one processor after the first time period elapses, M pieces of navigation data from the N pieces of navigation data of the mobile terminal in the first buffer, wherein N≥M, M≥1, and M;
   obtaining, by the at least one processor after the first time period elapses, the K pieces of position change data of the mobile terminal in the second buffer; and
   combining, by the at least one processor, the M pieces of navigation data and the K pieces of position change data, to obtain position information of the mobile terminal in the first time period.

2. The method according to claim 1, wherein each of the N pieces of navigation data corresponds to one moment and one signal strength, and wherein the N pieces of navigation data correspond to moments $t_1, t_2, \ldots,$ and $t_N$ respectively according to an order of the moments;
   wherein the obtaining, by the at least one processor, M pieces of navigation data from the N pieces of navigation data of the mobile terminal comprises:
      traversing, by the at least one processor according to the order of the moments, signal strengths of the N pieces of navigation data;
      determining, by the at least one processor, a status of first navigation data to be high, wherein the first navigation data is the first piece of navigation data of the N pieces of navigation data, with a signal strength greater than or equal to a first preset threshold;
      determining, by the at least one processor, a status of another piece of navigation data in the following manner, wherein the another piece of navigation data is navigation data, following the first navigation data, of the N pieces of navigation data, wherein:
         if a status of navigation data at a moment $t_i$ is high, when a signal strength of navigation data at a moment $t_{i+1}$ is less than a second preset threshold, determining a status of the navigation data at the moment $t_{i+1}$ to be low; or
         if a status of navigation data at a moment $t_i$ is low, when a signal strength of navigation data at a moment $t_{i+1}$ is greater than or equal to a third preset threshold, determining a status of the navigation data at the moment $t_{i+1}$ to be high, wherein 1≤i≤n, i is an integer, and the second preset threshold is greater than the third preset threshold; and
      determining, by the at least one processor, all navigation data whose status is as high as the M pieces of navigation data.

3. The method according to claim 1, wherein the obtaining, by the at least one processor, M pieces of navigation data from the N pieces of navigation data of the mobile terminal comprises:
   wherein each of the N pieces of navigation data corresponds to one moment and one signal strength, and wherein the N pieces of navigation data correspond to moments $t_1, t_2, \ldots,$ and $t_N$ respectively according to an order of the moments;
   traversing, by the at least one processor according to the order of the moments, signal strengths of the N pieces of navigation data;
   obtaining, by the at least one processor, a status of previous navigation data preceding the first piece of navigation data of the N pieces of navigation data, wherein a moment to corresponding to the previous navigation data is prior to the moment $t_1$ corresponding to the first piece of navigation data, and the moment $t_0$ is adjacent to the moment $t_1$;

determining, by the at least one processor, statuses of the N pieces of navigation data in the following manner:
   if a status of navigation data at a moment $t_{i-1}$ is high, when a signal strength of navigation data at a moment $t_i$ is less than a second preset threshold, determining a status of the navigation data at the moment $t_i$ to be low; or
   if a status of navigation data at a moment $t_{i-1}$ is low, when a signal strength of navigation data at a moment $t_i$ is greater than or equal to a third preset threshold, determining a status of the navigation data at the moment $t_i$ to be high, wherein $1 \leq i \leq n$, i is an integer, and the second preset threshold is greater than the third preset threshold; and
determining, by the at least one processor, all navigation data whose status is high as the M pieces of navigation data.

4. The method according to claim 1, wherein each of the navigation data corresponds to one moment, and each of the position change data corresponds to one moment;
   and when a moment of the $m^{th}$ piece of navigation data is the same as a moment of the $n^{th}$ piece of position change data, the $m^{th}$ piece of navigation data is set to match the $n^{th}$ piece of position change data; and
   wherein the combining, by the at least one processor, the M pieces of navigation data and the K pieces of position change data, to obtain position information of the mobile terminal in the first time period comprises:
      obtaining, by the at least one processor, navigation data and position change data that match each other from the M pieces of navigation data and the K pieces of position change data; and
      combining, by the at least one processor, the navigation data and the position change data that match each other, and in combination with position change data that is not combined, obtaining the position information of the mobile terminal in the first time period.

5. The method according to claim 1, wherein the navigation data is data obtained through calculation by using the satellite navigation signal and from which position coordinates are to be calculated, and the combining, by the at least one processor, the M pieces of navigation data and the K pieces of position change data, to obtain position information of the mobile terminal in the first time period comprises:
   obtaining, by the at least one processor through calculation, M position coordinates according to the M pieces of navigation data; and
   combining, by the at least one processor, the M position coordinates and the K pieces of position change data, to obtain the position information of the mobile terminal in the first time period.

6. The method according to claim 1, wherein the navigation data is position coordinates.

7. The method according to claim 1, wherein
the at least one processor remains in a sleep state during the first time period; and
the at least one processor is woken up after the first time period elapses.

8. The method according to claim 1, wherein the method further comprises:
   entering, by the at least one processor, a sleep state after obtaining the position information of the mobile terminal in the first time period.

9. The method according to claim 1, wherein the position information of the mobile terminal in the first time period comprises at least two position coordinates, and wherein each of the position coordinates corresponds to one moment of the first time period.

10. A positioning method for a mobile terminal, wherein the mobile terminal comprises at least one processor and a global navigation satellite system (GNSS) receiver, and the method comprises:
   receiving, by the GNSS receiver and from one or more GNSS navigation satellites, a satellite navigation signal during a first time period;
   obtaining through calculation N pieces of navigation data according to the satellite navigation signal, and buffering the N pieces of navigation data in a first buffer, wherein $N \geq 1$, and N is an integer;
   monitoring, during the first time period, movement data of the mobile terminal by using a sensor of the mobile terminal;
   obtaining through calculation K pieces of position change data of the mobile terminal according to the data obtained by the sensor through monitoring, and buffering the K pieces of position change data in a second buffer, wherein $K \geq 1$, and K is an integer;
   obtaining, by the at least one processor after the first time period elapses, M pieces of navigation data from the N pieces of navigation data in the first buffer, wherein $N \geq M$, $M \geq 1$, and M is an integer; and
   performing, by the at least one processor, fusion processing on the M pieces of navigation data and the K pieces of position change data in the second buffer, to obtain position information of the mobile terminal in the first time period.

11. The method according to claim 10, wherein the obtaining, by the at least one processor, M pieces of navigation data from the N pieces of navigation data comprises:
   wherein each of the N pieces of navigation data corresponds to one moment and one signal strength, and the N pieces of navigation data correspond to moments $t_1$, $t_2$, ..., and $t_N$ respectively according to an order of the moments;
   traversing, by the at least one processor according to the order of the moments, signal strengths of the N pieces of navigation data;
   determining, by the at least one processor, a status of first navigation data to be high, wherein the first navigation data is the first piece of navigation data, of the N pieces of navigation data, with a signal strength greater than or equal to a first preset threshold;
   determining, by the at least one processor, a status of another piece of navigation data in the following manner, wherein the another piece of navigation data is navigation data, following the first navigation data, of the N pieces of navigation data, wherein:
      if a status of navigation data at a moment $t_i$ is high, when a signal strength of navigation data at a moment $t_{i+1}$ is less than a second preset threshold, determining a status of the navigation data at the moment $t_{i+1}$ to be low; or
      if a status of navigation data at a moment $t_i$ is low, when a signal strength of navigation data at a moment $t_{i+1}$ is greater than or equal to a third preset threshold, determining a status of the navigation data at the moment $t_{i+1}$ to be high, wherein $1 \geq i \geq n$, i is an integer, and the second preset threshold is greater than the third preset threshold; and
   determining, by the at least one processor, all navigation data whose status is high as the M pieces of navigation data.

12. The method according to claim 10, wherein the obtaining, by the at least one processor, M pieces of navigation data from the N pieces of navigation data comprises:
   wherein each of the N pieces of navigation data corresponds to one moment and one signal strength, and the N pieces of navigation data correspond to moments $t_1$, $t_2$, ..., and $t_N$ respectively according to an order of the moments;
   traversing, by the at least one processor according to the order of the moments, signal strengths of the N pieces of navigation data;
   obtaining, by the at least one processor, a status of previous navigation data preceding the first piece of navigation data of the N pieces of navigation data, wherein a moment to corresponding to the previous navigation data is prior to the moment $t_1$ corresponding to the first piece of navigation data, and the moment to is adjacent to the moment $t_1$;
   determining, by the at least one processor, statuses of the N pieces of navigation data in the following manner:
      if a status of navigation data at a moment $t_{i-1}$ is high, when a signal strength of navigation data at a moment $t_i$ is less than a second preset threshold, determining a status of the navigation data at the moment $t_i$ to be low; or
      if a status of navigation data at a moment is low, when a signal strength of navigation data at a moment $t_i$ is greater than or equal to a third preset threshold, determining a status of the navigation data at the moment $t_i$ to be high, wherein 1≤i≤n, i is an integer, and the second preset threshold is greater than the third preset threshold; and
   determining, by the at least one processor, all navigation data whose status is high as the M pieces of navigation data.

13. The method according to claim 10, wherein each of the navigation data corresponds to one moment, and each of the position change data corresponds to one moment, and wherein when a moment of the $m^{th}$ piece of navigation data is the same as a moment of the $n^{th}$ piece of position change data, the $m^{th}$ piece of navigation data is set to match the $n^{th}$ piece of position change data; and
   wherein the performing, by the at least one processor, fusion processing on the M pieces of navigation data and the K pieces of position change data, to obtain position information of the mobile terminal in the first time period comprises:
      obtaining, by the at least one processor, navigation data and position change data that match each other from the M pieces of navigation data and the K pieces of position change data; and
      combining, by the at least one processor, the navigation data and the position change data that match each other, and in combination with position change data that is not combined, obtaining the position information of the mobile terminal in the first time period.

14. The method according to claim 10, wherein the navigation data is data obtained through calculation by using the satellite navigation signal and from which position coordinates are to be calculated, and wherein the performing, by the at least one processor, fusion processing on the M pieces of navigation data and the K pieces of position change data, to obtain position information of the mobile terminal in the first time period comprises:
   obtaining, by the at least one processor through calculation, M position coordinates according to the M pieces of navigation data; and
   combining, by the at least one processor, the M position coordinates and the K pieces of position change data, to obtain the position information of the mobile terminal in the first time period.

15. The method according to claim 10, wherein the navigation data is position coordinates.

16. The method according to claim 10, wherein
   the at least one processor remains in a sleep state during the first time period; and
   the at least one processor is woken up after the first time period elapses.

17. The method according to claim 10, wherein the method further comprises:
   entering, by the at least one processor, a sleep state after obtaining the position information of the mobile terminal in the first time period.

18. The method according to claim 10, wherein the position information of the mobile terminal in the first time period comprises at least two position coordinates, and wherein each of the position coordinates corresponds to one moment of the first time period.

19. A mobile terminal, comprising at least one processor, a global navigation satellite system (GNSS) receiver, and a sensor, wherein
   the GNSS receiver is configured to:
      receive, from one or more GNSS navigation satellites, a satellite navigation signal during a first time period;
      store N pieces of navigation data of the mobile terminal in a first buffer, wherein N is an integer, and wherein the N pieces of navigation data are obtained through calculation by using the satellite navigation signal received during the first time period; and
      calculate navigation data from the satellite navigation signal, wherein the navigation data is data from which position coordinates are to be calculated or the navigation data is position coordinates;
   the sensor is configured to:
      monitor movement data of the mobile terminal during the first time period;
      store K pieces of position change data of the mobile terminal in a second buffer, wherein K≤l, K is an integer, and the K pieces of position change data are obtained through calculation by using the movement data of the mobile terminal during the first time period; and
   the at least one processor is configured to:
      obtain, after the first time period elapses, M pieces of navigation data from the N pieces of navigation data of the mobile terminal in the first buffer, wherein N≤M, M≤1, and M is an integer;
      obtain, after the first time period elapses, the K pieces of position change data of the mobile terminal in the second buffer; and
      combine the M pieces of navigation data and the K pieces of position change data to obtain position information of the mobile terminal in the first time period.

20. The mobile terminal according to claim 19, wherein the first time period comprises a second time period,
   the GNSS receiver is in a sleep state during the second time period; and
   the sensor is in a working state during the first time period.

* * * * *